United States Patent
Ikushima et al.

(10) Patent No.: US 8,817,397 B2
(45) Date of Patent: Aug. 26, 2014

(54) LENS ACTUATOR

(75) Inventors: Kimiya Ikushima, Osaka (JP);
Hidekazu Tanaka, Osaka (JP);
Hiroyuki Togawa, Osaka (JP); Tatsuya Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 13/489,766

(22) Filed: Jun. 6, 2012

(65) Prior Publication Data
US 2012/0314308 A1 Dec. 13, 2012

(30) Foreign Application Priority Data

Jun. 9, 2011 (JP) ................... 2011-128787
Nov. 15, 2011 (JP) ................... 2011-249266
Nov. 29, 2011 (JP) ................... 2011-259963

(51) Int. Cl.
*G02B 7/02* (2006.01)
*G02B 27/64* (2006.01)
*H02K 41/035* (2006.01)
*G02B 7/08* (2006.01)

(52) U.S. Cl.
CPC ............... *G02B 7/08* (2013.01); *G02B 27/646* (2013.01); *H02K 41/0356* (2013.01)
USPC ............ 359/814; 359/813; 359/819; 359/823

(58) Field of Classification Search
USPC ........ 359/676, 694, 703–704, 811, 813–814, 359/819–820, 822–824; 396/529–530
See application file for complete search history.

(56) References Cited

U.S. PATENT DOCUMENTS

| | | |
|---|---|---|
| 2002/0176713 A1 | 11/2002 | Kai et al. |
| 2005/0231829 A1 | 10/2005 | Miyagi et al. |
| 2006/0132613 A1 | 6/2006 | Shin et al. |
| 2006/0269262 A1 | 11/2006 | Shin et al. |
| 2008/0152332 A1 | 6/2008 | Koo et al. |
| 2008/0285162 A1 | 11/2008 | Fujita et al. |
| 2011/0097062 A1* | 4/2011 | Tsuruta et al. ................ 396/55 |
| 2011/0103782 A1 | 5/2011 | Tsuruta et al. |

FOREIGN PATENT DOCUMENTS

| | | |
|---|---|---|
| CN | 1698106 | 11/2005 |
| CN | 1910491 | 2/2007 |
| CN | 101236307 | 8/2008 |
| CN | 102016708 | 4/2011 |
| JP | 2002-133677 | 5/2002 |
| JP | 2003-123287 | 4/2003 |
| JP | 2005-018837 | 1/2005 |
| WO | 2009/133691 | 11/2009 |

OTHER PUBLICATIONS

English Translation of Chinese Search Report issued on Apr. 28, 2014 for the related Chinese Patent Application No. 201210189137.7.

* cited by examiner

*Primary Examiner* — William Choi
*Assistant Examiner* — Sharrief Broome
(74) *Attorney, Agent, or Firm* — Panasonic Patent Center

(57) ABSTRACT

In a lens actuator according to an exemplary embodiment, wires that connect a holder and a base of a movable unit have diameters of 30 µm or more and less than 70 µm, and the wires have longitudinal elastic moduli of 100 GPa or more and less than 500 GPa. The wire is flexible even if a small amount of currents are passed through a plurality of OIS coils, and the lens actuator suitable to electric power saving can be provided.

7 Claims, 6 Drawing Sheets

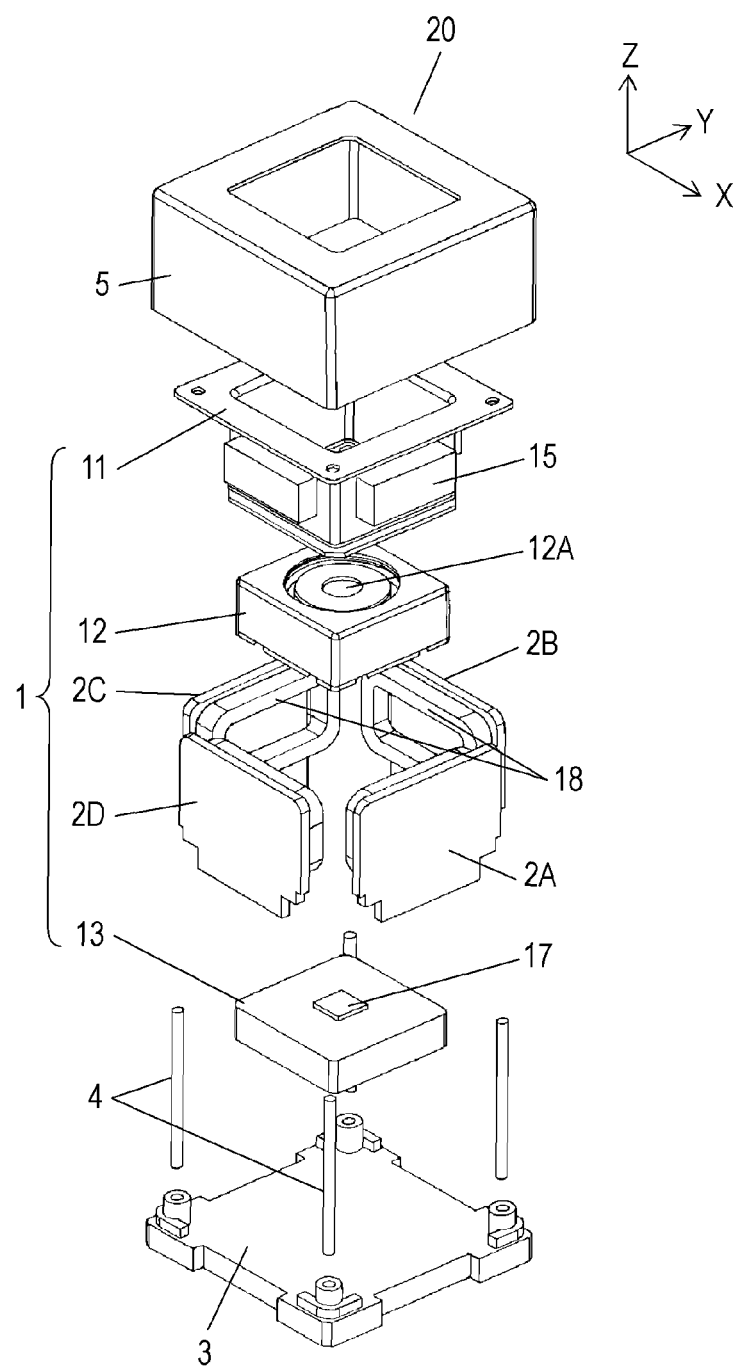

LENS ACTUATOR

BACKGROUND

1. Technical Field

The technical field relates to a lens actuator, which is used in a camera and a mobile phone.

2. Description of the Related Art

Recently, in a camera and a mobile phone, there has been proposed use of a lens actuator including a shake correction mechanism. The shake correction mechanism mechanically suppresses a vibration of a lens in order to prevent a disturbance of a video image or an image due to a camera shake during shooting.

A conventional lens actuator will be described with reference to FIGS. 5 and 6.

FIG. 5 is a perspective sectional view of conventional lens actuator 20. FIG. 6 is an exploded perspective view of lens actuator 20.

Lens actuator 20 includes movable unit 1, four coil retaining bodies 2A to 2D, lower cover 3, four wires 4, and upper cover 5. In lens actuator 20, movable unit 1 is swung when the camera shake is generated to suppress the disturbance of the video image or the image.

Movable unit 1 includes magnet holder 11, auto focus unit 12 in which the lens moves vertically therein, and imaging body 13.

Eight magnets 14 are fixed to an inside of auto focus unit 12 while arrayed in two upper and lower stages. Four magnets 15, each being slightly larger than magnet 14, are fixed to lateral surfaces on front-back and left-right sides of magnet holder 11.

Auto focus unit 12 includes round hole 12A to which the lens is fixed, and auto focus unit 12 is accommodated inside magnet holder 11. In auto focus unit 12, AF (Auto Focus) coil 16 is disposed opposite magnet 14.

In movable unit 1, a current passed through AF coil 16 generates an electromagnetic force between magnet 14 and AF coil 16, while the lens is allowed to move vertically in auto focus unit 12.

Imaging element 17 is disposed on an upper surface of imaging body 13. Imaging element 17 is a semiconductor element, such as a CCD (Charge Coupled Device) image sensor and a CMOS (Complementary Metal Oxide Semiconductor) image sensor.

Imaging element 17 is disposed below the center of round hole 12A. The vertical movement of the lens can perform auto focus control in which the video image or the image captured by imaging element 17 is automatically brought into focus.

One end of wire 4 is connected to each of four corners of lower cover 3, and the other end is connected to each of four corners in an upper surface of magnet holder 11 of movable unit 1. Wire 4 swingably retains movable unit 1 on lower cover 3.

Generally, a metallic wire having a diameter of 70 μm or more and less than 110 μm is used as wire 4, and movable unit 1 swings with deformation of wire 4. Wire 4 is desirably made of beryllium copper or phosphor bronze.

Coil retaining bodies 2A to 2D are disposed on front-back and left-right sides of movable unit 1. OIS (Optical Image Stabilization) coil 18 is disposed opposite magnet 15.

A current is passed through OIS coil 18 when the camera shake is generated in lens actuator 20. The electromagnetic force generated between OIS coil 18 and magnet 15 swings movable unit 1.

The swing of movable unit 1 performs shake correction control to correct the shake of the video image or the image captured by imaging element 17.

SUMMARY

In a preferable mode, a lens actuator includes a plurality of wires that connect a holder and a base, the wires have diameters of 30 μm or more and less than 70 μm, and the wires have longitudinal elastic moduli of 100 GPa or more and less than 500 GPa. Therefore, since the wire is flexible even if a small amount of current is passed through the OIS coil, the lens actuator suitable to electric power saving can be provided.

BRIEF DESCRIPTION OF DRAWINGS

FIG. 6 is an exploded perspective view of the conventional lens actuator.

DETAILED DESCRIPTION OF THE PREFERRED EMBODIMENT

First Exemplary Embodiment

Figure 1:
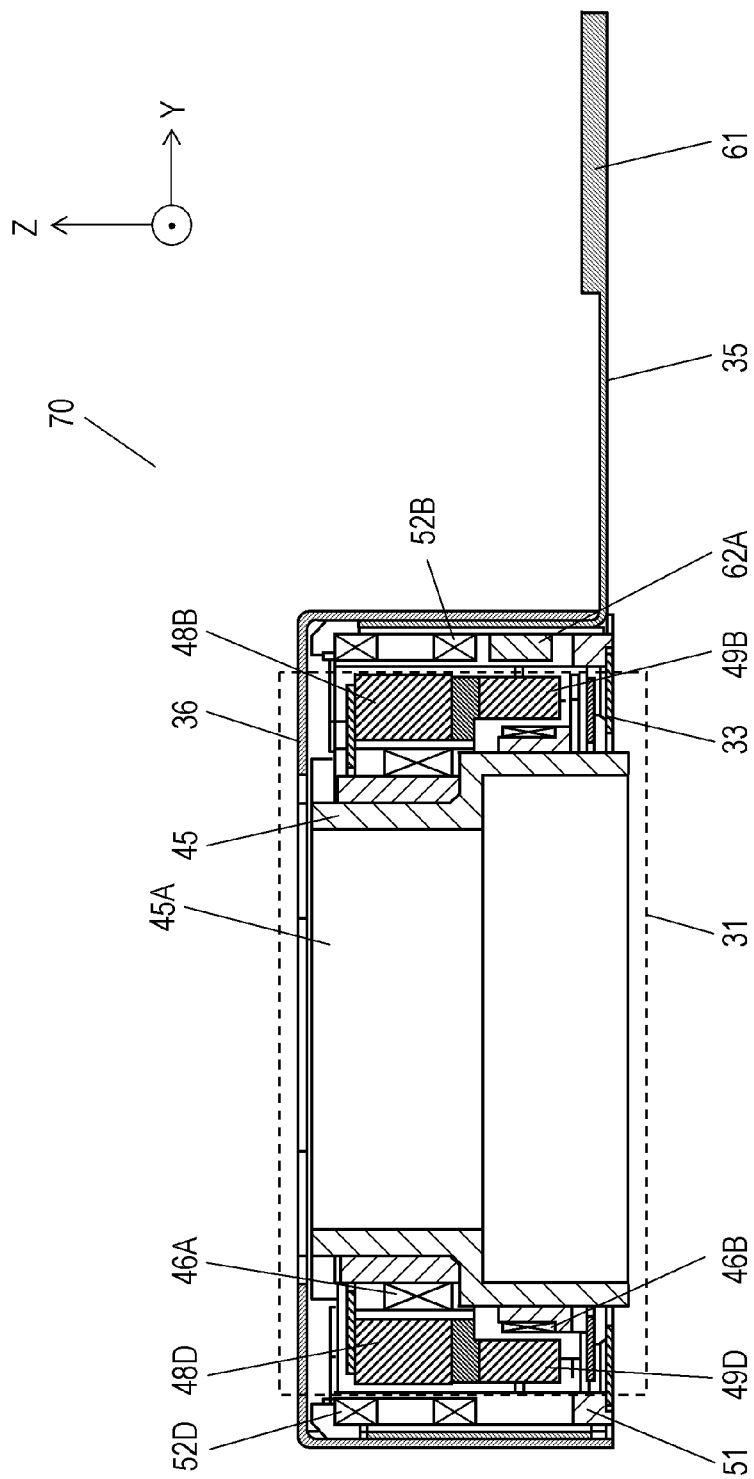
FIG. 1 is a sectional view of a lens actuator according to a first exemplary embodiment.
Figure 2:
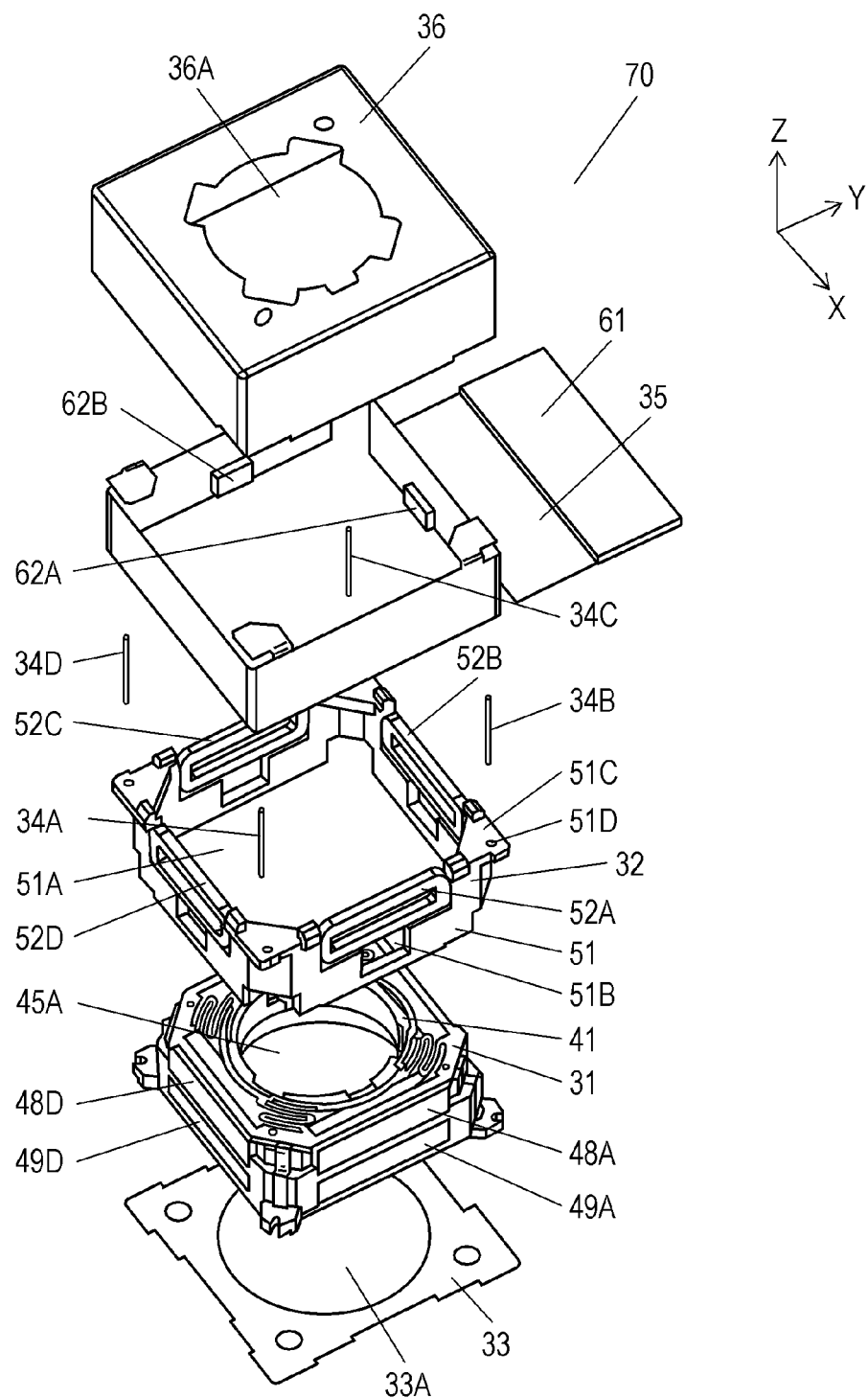
FIG. 2 is an exploded perspective view of the lens actuator of the first exemplary embodiment.
Figure 3:
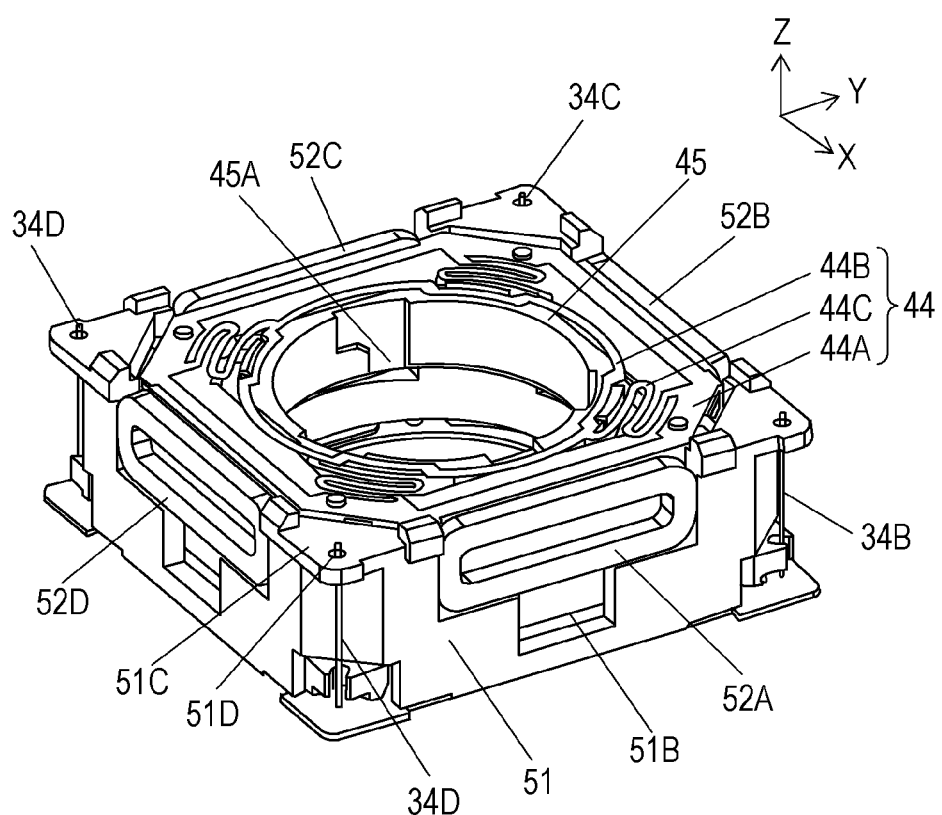
FIG. 3 is a partially perspective view of the lens actuator of the first exemplary embodiment.

FIG. 1 is a sectional view of lens actuator 70 according to a first exemplary embodiment. FIG. 2 is an exploded perspective view of lens actuator 70. FIG. 3 is a partially perspective view of lens actuator 70 from which upper cover 36 and flexible printed board 35 are dismounted.

Lens actuator 70 includes movable unit 31, a plurality of OIS (Optical Image Stabilization) coils 52A and 52D that are disposed in at least two directions while facing movable unit 31, base 51 that fixes OIS coils 52A and 52D, and a plurality of wires 34A and 34B that connect movable unit 31 and base 51.

Carrier 45 moves in an optical axis direction by an electromagnetic force, which is generated between AF (Auto Focus) coil 46A and magnet 48A, and movable unit 31 moves in a direction perpendicular to the optical axis direction by electromagnetic forces, which are generated between OIS coils 52A and 52D and magnets 48A and 48D. Wires 34A and 34B have diameters of 30 μm or more and less than 70 μm, and wires 34A and 34B have longitudinal elastic moduli of 100 GPa or more and less than 500 GPa.

Movable unit 31 includes carrier 45 that retains the lens, AF coil 46A that is wound around carrier 45 with the optical axis direction of the lens as a center, magnet 48A that is disposed opposite AF coil 46A in a direction perpendicular to the optical axis direction, and a holder that fixes magnets 48A to 48D.

Therefore, because the wire is flexible even if a small amount of current is passed through the OIS coil, a lens actuator suitable for electric power saving can be achieved.

Lens actuator 70 includes movable unit 31, coil unit 32, lower cover 33, wires 34A to 34D, flexible printed board 35, and upper cover 36.

For example, lens actuator 70 has widths of 5 mm to 20 mm in a left-right direction (Y-axis direction) parallel to a lens retaining surface, depths of 5 mm to 20 mm in a front-back direction (X-axis direction) parallel to the lens retaining surface, and heights of 2 mm to 10 mm in a vertical direction (Z-axis direction) perpendicular to the lens retaining surface, and the width in the left-right direction is substantially equal to the depth in the front-back direction.

Figure 4:
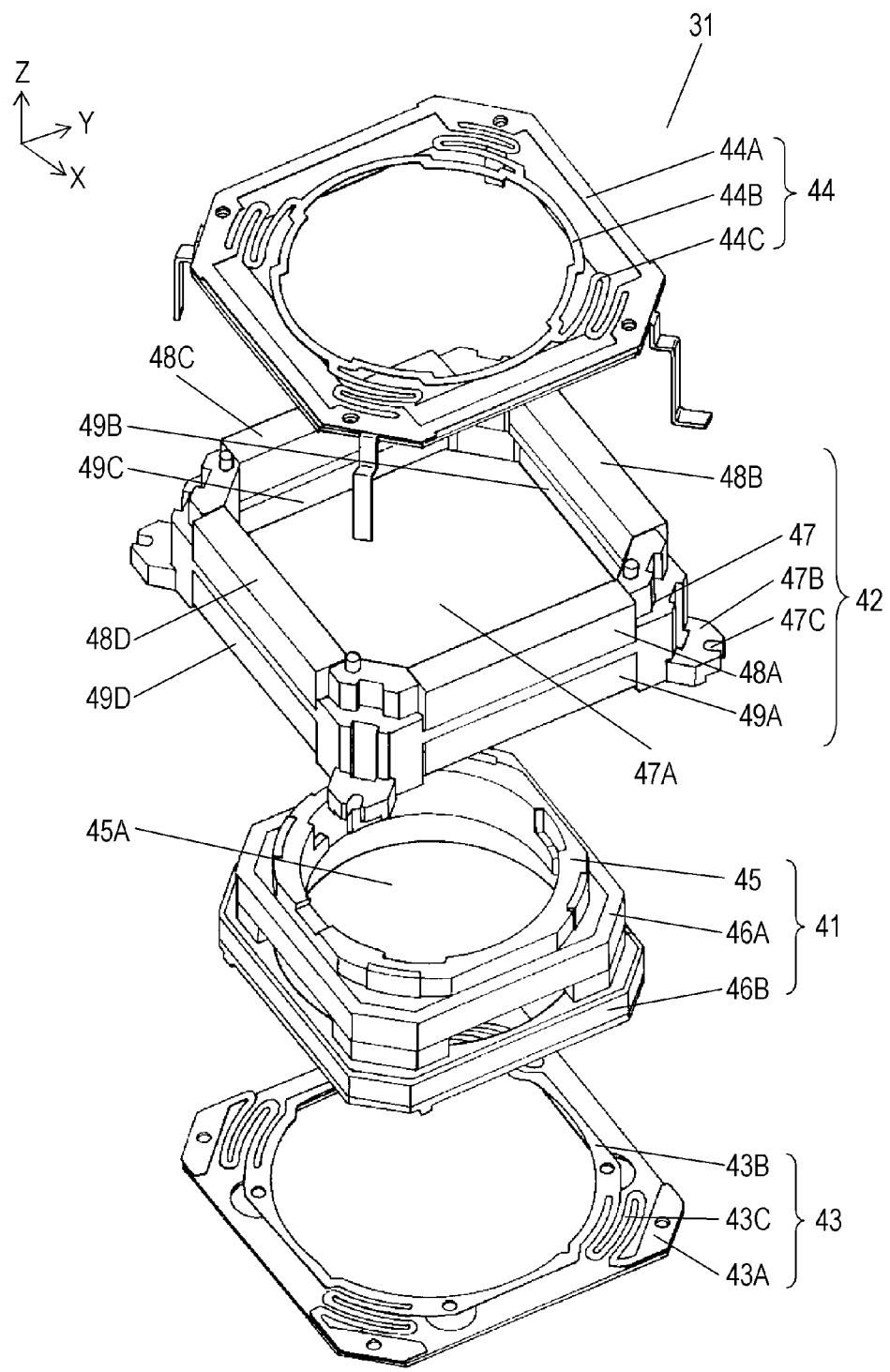
FIG. 4 is an exploded perspective view of a movable unit used for the lens actuator of the first exemplary embodiment.
Figure 5:
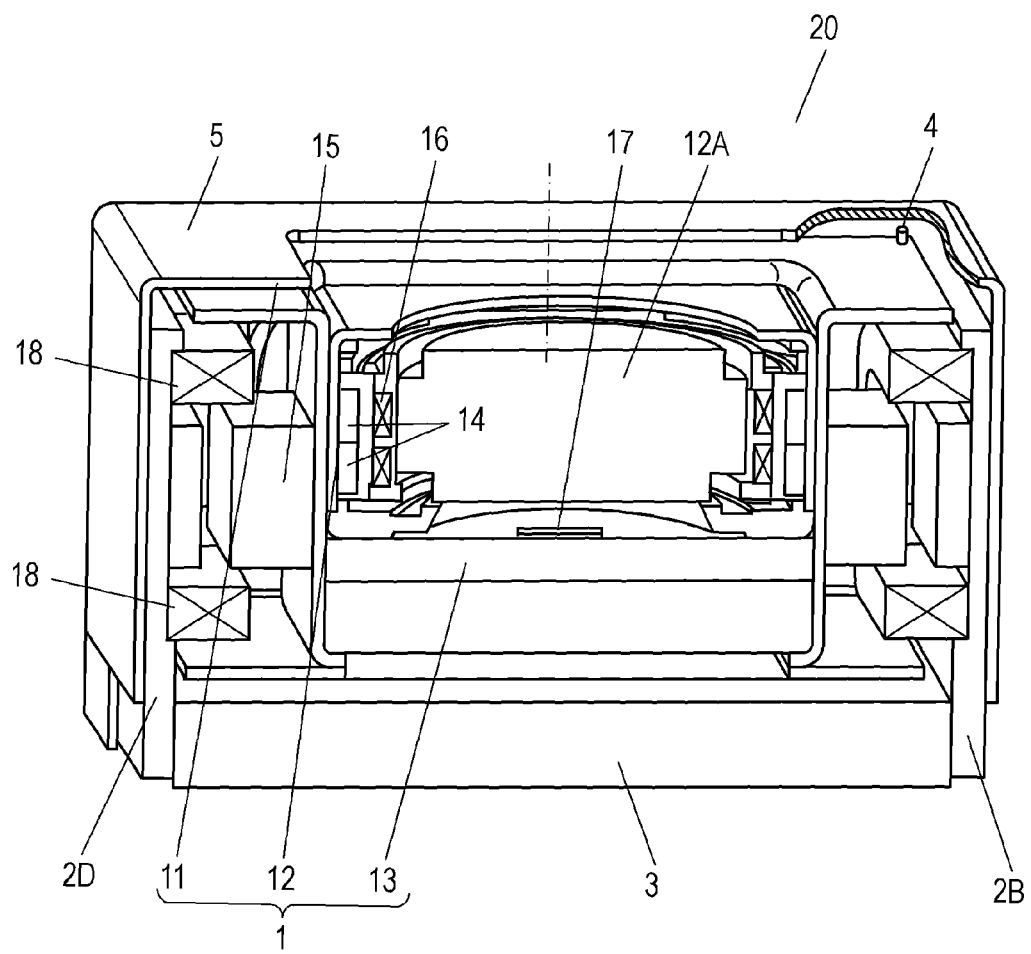
FIG. 5 is a perspective sectional view of a conventional lens actuator.

First, a configuration of movable unit 31 will be described. FIG. 4 is an exploded perspective view of movable unit 31.

As illustrated in FIGS. 1 and 4, movable unit 31 includes lens holder 41, magnet holder 42, lower spring 43, and upper spring 44.

Lens holder 41 includes carrier 45 and AF coils 46A and 46B that are disposed on an outer circumference of carrier 45 into two upper and lower stages.

Preferably, the carrier 45 is made of an insulating resin, such as polycarbonate containing glass, and has a rectangular box shape that includes round hole 45A in the center. A diameter of round hole 45A may be kept constant or changed. A screw thread may be included inside the round hole 45A in order to fix the lens to round hole 45A.

AF coils 46A and 46B are formed such that a coil wire made of an enameled wire having wire diameters of 40 μm to 60 μm is wound around carrier 45 with a center axis direction of round hole 45A as an axis.

Magnet holder 42 includes holder 47, magnets 48A to 48D, and magnets 49A to 49D.

Holder 47 made of an insulating resin, such as polycarbonate containing glass, has a rectangular box shape that includes square hole 47A in the center. Holder-side limbs 47B overhanging on four directions are provided on a bottom surface side of holder 47, and holder-side latch 47C that constitutes a substantially V-shape groove is provided in each holder-side limb 47B.

Slightly large magnets 48A to 48D having a rectangular solid shape and slightly small magnets 49A to 49D having a rectangular solid shape are disposed on side surfaces in the front-back and left-right directions of holder 47. Magnets 48A to 48D and magnets 49A to 49D are located in upper portions and lower portions of the side surfaces with a predetermined distance, respectively. Magnets 48A to 48D and magnets 49A to 49D are fixed to the side surfaces using an adhesive (not illustrated) or the like.

Magnets 48A to 48D and magnets 49A to 49D are magnetized such that magnetic poles on inner surface sides of magnets 48A to 48D and magnets 49A to 49D differ from each other, and such that magnetic poles on lateral surface sides of magnets 48A to 48D and magnets 49A to 49D also differ from each other. For example, the inner surfaces of magnets 48A to 48D are magnetized into an S-pole while the inner surfaces of magnets 49A to 49D are magnetized into an N-pole. Therefore, the lateral surfaces of magnets 48A to 48D are magnetized in the N-pole while the lateral surfaces of magnets 49A to 49D are magnetized in the S-pole.

Magnets 48A to 48D and magnets 49A to 49D are also magnetized such that the magnetic poles of the inner surfaces of magnets 48A to 48D and magnets 49A to 49D, which are vertically disposed, differ from each other. Magnets 48A to 48D and magnets 49A to 49D are also magnetized such that the magnetic poles of the lateral surfaces of magnets 48A to 48D and magnets 49A to 49D differ from each other. Therefore, a radial direction of a magnetic field is rectified to generate the stronger magnetic field.

For example, magnets 48A to 48D and magnets 49A to 49D are neodymium magnets that are rare-earth magnets mainly containing neodymium, iron, and boron. A magnet other than the neodymium magnet may also be used. However, because the neodymium magnet has a large magnetic force, currents flowing through AF coils 46A and 46B can be advantageously decreased from the viewpoint of electric power saving. The neodymium magnet having coercive forces of 500 kA/m to 3000 kA/m and residual magnetic flux densities of 1.3 T to 1.5 T is desirably used.

Because the inner surfaces of magnets 48A to 48D are magnetized in the S-pole while the inner surfaces of magnets 49A to 49D are magnetized in the N-pole, magnets 48A to 48D exert repulsive forces on one another, and magnets 49A to 49D exert repulsive forces on one another. In holder 47, sidewalls that are in contact with magnets 48A to 48D and magnets 49A to 49D are desirably provided outside magnets 48A to 48D and magnets 49A to 49D in order to counteract the repulsive forces.

Lens holder 41 is accommodated in square hole 47A of holder 47. Magnets 48A to 48D and magnets 49A to 49D are disposed opposite AF coils 46A and 46B, respectively.

In movable unit 31, the electromagnetic forces are generated between AF coil 46A and magnets 48A to 48D and AF coil 46B and magnets 49A to 49D by flowing the currents through AF coils 46A and 46B. The electromagnetic force can vertically move lens holder 41 relative to magnet holder 42.

Lower spring 43 is a conductive-metal plate spring in which outer peripheral portion 43A and inner peripheral portion 43B are connected by a plurality of meandering springs 43C. Upper spring 44 is a conductive-metal plate spring in which outer peripheral portion 44A and inner peripheral portion 44B are connected by a plurality of meandering springs 44C.

Outer peripheral portion 43A and outer peripheral portion 44A are fixed to magnet holder 42, and inner peripheral portion 43B and inner peripheral portion 44B are fixed to lens holder 41. When the currents does not flow through AF coils 46A and 46B, lens holder 41 can return to a predetermined position relative to magnet holder 42.

When the currents flow through AF coils 46A and 46B, lens holder 41 moves vertically relative to magnet holder 42. Lens holder 41 is stopped by a balance among a gravity applied to lens holder 41, spring forces of lower spring 43 and upper spring 44, and the electromagnetic force. When the currents do not flow through AF coils 46A and 46B, lens holder 41 returns to the predetermined position relative to magnet holder 42.

Referring to FIGS. 1 to 3, structural elements other than movable unit 31 will be described below.

Coil unit 32 includes base 51 and OIS coils 52A to 52D. Base 51 made of an insulating resin or the like has a rectangular box shape that includes square hole 51A in the center. Base 51 includes T-shape grooves 51B that are provided in the sidewalls on front-back and left-right sides and a plurality of base-side limbs 51C that are projected in four directions on the upper surface. The hole 51D is made in each of base-side limbs 51C.

OIS coils 52A to 52D are fixed to an upper half of groove 51B using an adhesive (not illustrated) or the like. OIS coils 52A to 52D are formed such that a coil wire having wire diameters of 40 μm to 60 μm is wound about the axis in the front-back or left-right direction. An enameled wire, such as a polyurethane-copper wire, a polyester-copper wire, and a polyamide-copper wire, is preferably used as the coil wire constituting each of OIS coils 52A to 52D.

Examples of a method for fixing OIS coils 52A to 52D include a method for forming a resin bobbin to directly wind a coil wire around the bobbin and a method for forming an air-core coil and then fixing OIS coils 52A to 52D to base 51 using an adhesive or the like. The method for forming the air-core coil is desirably adopted from the view point of downsizing. Desirably, using a self-welding enameled wire, the coil wires are fused to each other by a hot blast or alcohol to stabilize a shape.

A printed coil can be used as OIS coils 52A to 52D. The printed coil means a coil that is formed by film deposition and patterning.

The film deposition is performed by a method, such as vapor deposition, sputtering, ion plating, electroless plating, and electrolytic plating.

For example, the patterning is performed by a method in which mask formation with a photoresist and etching are combined. The mask is formed on the copper thin film using the photoresist to perform electrolytic plating, and then copper in a portion other than the pattern is removed by etching or the like. The etching may be dry etching or wet etching.

In preparing the printed coil, electrolytic plating may further be performed after a copper thin film is deposited to perform the patterning.

The printed coil may be formed on the printed board. In this case, assembly productivity is improved because the printed coil is not deformed during assembly.

Wires 34A to 34D are conductive-metal wires. Wires 34A to 34D are also called a suspension wire. Movable unit 31 is accommodated in square hole 51A of base 51. Upper ends of wires 34A to 34D are latched in hole 51D of base 51, and lower ends are latched in holder-side latch 47C of holder 47. Movable unit 31 is accommodated in square hole 51A of base 51 with magnets 48A to 48D facing OIS coils 52A to 52D.

Movable unit 31 is connected to coil unit 32 through wires 34A to 34D. Movable unit 31 is retained by wires 34A to 34D, and movable unit 31 can move in coil unit 32 while being maintained in a horizontal position in the front-back and left-right directions.

The outer peripheral portions of magnets 48A to 48D face OIS coils 52A to 52D. When the currents flow through OIS coils 52A to 52D, the electromagnetic forces generated by magnets 48A to 48D and OIS coils 52A to 52D move movable unit 31 in coil unit 32.

Flexible printed board 35 having flexibility includes connector 61 that has a plurality of terminals on an end surface. A plurality of traces (not illustrated) are provided in flexible printed board 35. Flexible printed board 35 is sterically folded a plurality of times, and bent along the side surface and the upper surface in each of four directions of base 51. Two magnetic-field detection elements 62A and 62B are disposed on two inner surfaces of flexible printed board 35. The two side surfaces are in contact with the inner surface of base 51.

For example, magnetic-field detection elements 62A and 62B are Hall elements that use a Hall effect to detect magnetic field intensity. When magnet 49B comes close to magnetic-field detection element 62A, or when magnet 49C comes close to magnetic-field detection element 62B, the magnetic field detected by magnetic-field detection element 62A or 62B is increased. When magnet 49B moves away from magnetic-field detection element 62A, or when magnet 49C moves away from magnetic-field detection element 62B, the magnetic field detected by magnetic-field detection element 62A or 62B is weakened.

When movable unit 31 moves in coil unit 32, magnetic-field detection element 62B detects a position in the front-back direction of movable unit 31, and magnetic-field detection element 62A detects a position in the left-right direction of movable unit 31.

AF coils 46A and 46B are electrically connected to the terminals provided in connector 61 of flexible printed board 35 through lower spring 43, upper spring 44, and wires 34A to 34D. OIS coils 52A to 52D are electrically connected to the terminals provided in connector 61 of flexible printed board 35 by connecting end portions of the coil wires constituting OIS coils 52A to 52D to flexible printed board 35. Alternatively, OIS coils 52A and 52C or 52B and 52D may be electrically connected to the terminals provided in connector 61 of flexible printed board 35 while connected in series.

The currents flow through AF coils 46A and 46B and OIS coils 52A to 52D through the terminals provided in connector 61.

Lower cover 33 including round hole 33A in the center is a metallic plate made of a nonmagnetic material, such as aluminum and nickel silver. Lower cover 33 is fixed to a lower surface of base 51 using an adhesive (not illustrated) or the like.

Upper cover 36 including round hole 36A in the center is made of a nonmagnetic material, such as aluminum and nickel silver. Upper cover 36 is formed into a rectangular box shape with the lower surface opened. Movable unit 31, coil unit 32, wires 34A to 34D, and flexible printed board 35 are accommodated between upper cover 36 and lower cover 33. For example, upper cover 36 is fixed to lower cover 33 by welding or the like. Round hole 36A, round hole 45A, and round hole 33A are continuously made to form a through-hole from the upper surface to the lower surface of lens actuator 70.

Because upper cover 36 and lower cover 33 are both made of the nonmagnetic material, an influence on the electromagnetic forces generated between AF coil 46A and magnets 48A to 48D, AF coil 46B and magnets 49A to 49D, and OIS coils 52A to 52D and magnets 48A to 48D and magnets 49A to 49D is suppressed. Therefore, lens actuator 70 can be stably operated.

In lens actuator 70 configured as above, the lens (not illustrated) is retained in round hole 45A of lens holder 41, the imaging element (not illustrated), such as the CCD image sensor and the CMOS image sensor, is disposed below the lens, and lens actuator 70 is mounted on an electronic instrument, such as the camera and the mobile phone.

AF coils 46A and 46B and OIS coils 52A to 52D are connected to an electronic circuit (not illustrated) of the electronic instrument through the terminals of connector 61.

For example, when a shutter push button (not illustrated) of the electronic instrument is lightly pressed, a voltage is applied to the electronic circuit to flow the currents through AF coils 46A and 46B, thereby moving the lens holder 41 and the lens retained in round hole 45A of lens holder 41 vertically to perform the auto focus control, and bringing the video image or the image into focus.

When the camera shake occurs while the shooting is performed by further pressing the shutter push button, the electronic circuit detects the vibration using an angular velocity sensor (not illustrated) or the like that is separately provided in the electronic instrument. The electronic circuit moves movable unit 31 in the front-back and left-right directions by controlling the currents flowing through OIS coils 52A to 52D, thereby performing shake correction control.

A height of lens actuator 70 is desirably 4 mm or less from the viewpoint of the low-profile electronic instrument. Wires 34A to 34D desirably have lengths of 2.5 mm or more and 3.2 mm or less. Upper limits of the lengths of wires 34A to 34D are restricted by the height of lens actuator 70. Lower limits of the lengths of wires 34A to 34D are restricted by a resistance to a drop impact. This is because, when wires 34A to 34D are excessively shortened, the diameter obtaining a desired spring constant is decreased to hardly withstand the drop impact.

From the viewpoint of spring characteristics (such as a hysteresis, durability, and strength), wires 34A to 34D are desirably made of a copper alloy, tungsten, or a tungsten alloy. When power feeding is performed through wires 34A to 34D, wires 34A to 34D are desirably made of the copper alloy having a large electric conductivity. Examples of a tungsten compound include doped tungsten (tungsten in which potassium oxide or the like is doped) and rhenium tungsten (a compound of rhenium and tungsten).

When the copper alloy is used, from the viewpoint of spring characteristics, wires 34A to 34D are desirably made of copper, phosphor bronze, beryllium copper, copper, or a copper alloy (CuNiSn alloy) containing nickel and tin. From the viewpoint of drop strength, wires 34A to 34D are desirably made of beryllium copper or the CuNiSn alloy.

Tensile strength of tungsten or the tungsten compound is about twice as much as that of the copper alloy. When wires 34A to 34D are made of tungsten or the tungsten compound, the drop strength of lens actuator 70 can be increased.

When any one of the copper alloy, tungsten, and the tungsten compound is used, silver or copper plating may be performed to surfaces of wires 34A to 34D in order to decrease an electric resistance during flow of currents through wires 34A to 34D.

When any one of the copper alloy, tungsten, and tungsten compound is used, wires 34A to 34D desirably have longitudinal elastic moduli of 100 GPa or more and less than 500 GPa.

Wires 34A to 34D are desirably made of the copper alloy from the viewpoint of workability of wires 34A to 34D. In this case, wires 34A to 34D desirably have longitudinal elastic moduli of 100 GPa or more and less than 150 GPa. When wires 34A to 34D are made of beryllium copper or the CuNiSn alloy, wires 34A to 34D have longitudinal elastic moduli of 110 GPa or more and less than 140 GPa.

When wires 34A to 34D are made of tungsten or the tungsten compound, wires 34A to 34D desirably have longitudinal elastic moduli of 350 GPa or more and less than 500 GPa. Wires 34A to 34D more preferably have longitudinal elastic moduli of 350 GPa or more and less than 450 GPa.

The diameter ranges of wires 34A to 34D will be described.

The spring constants of wires 34A to 34D are determined from the diameters of wires 34A to 34D. When movable unit 31 is supported by four wires 34A to 34D, the total of the spring constants desirably falls within a predetermined range for the following reason.

A resonant frequency of lens actuator 70 is determined from the spring constants of wires 34A to 34D and a mass of movable unit 31. At this point, the resonant frequency is desirably 50 Hz or more in order to accurately perform the shake correction control. The lower limit of the spring constant is determined from this viewpoint. On the other hand, the upper limit of the spring constant is determined from a travel distance of movable unit 31, which is necessary for performing the shake correction control.

A weight of movable unit 31 is in a range of about 0.3 g or more and 0.7 g or less. The travel distance of movable unit 31, which is necessary for performing the shake correction control, is determined from a correction angle, which is necessary for performing the shake correction control, and a focal distance. When the correction angle is ±0.5° or more while the focal distance is 6 mm or less, the travel distance of movable unit 31 is about 60 μm or more.

In order to accurately perform the shake correction control under the above conditions, when the resonant frequency is 50 Hz or more while the travel distance of movable unit 31 is 60 μm or more, the use of the copper alloy differs slightly from the use of tungsten or the tungsten compound in the proper diameters of wires 34A to 34D.

When the copper alloy is used, wires 34A to 34D desirably have diameters of 40 μm or more and less than 70 μm. From the viewpoint of workability, wires 34A to 34D more desirably have diameters of 50 μm or more and less than 70 μm. The diameters of wires 34A to 34D are desirably 66 μm or more when the travel distance of movable unit 31 is set to 80 μm or more in order to increase an effect of the shake correction control in consideration of moving picture photographing.

Since movable unit 31 includes magnets 48A to 48D and 49A to 49D, a weight of movable unit 31 is about 0.5 g or more. In this case, the diameters of wires 34A to 34D are desirably 68 μm or less.

The diameters of wires 34A to 34D are desirably 62 μm or less when the travel distance of movable unit 31 is set to 80 μm or more while the weight of movable unit 31 is 0.5 g or more.

In the first exemplary embodiment, four wires 34A to 34D are provided. When the number of wires is five or more, the diameter is desirably set smaller than the above range. In particular, when movable unit 31 is supported by eight wires, the diameters of the wires desirably falls within the range of 61 μm or less.

On the other hand, when tungsten or the tungsten compound is used, wires 34A to 34D desirably have diameters of 30 μm or more and less than 60 μm. From the viewpoint of workability, wires 34A to 34D more desirably have diameters of 40 μm or more and less than 60 μm.

Thus, lens actuator 70 of the camera mounted on the electronic instrument, such as the mobile phone, becomes more suitable by selecting the diameters of wires 34A to 34D.

When the lens is tilted in lens actuator 70 of the camera mounted on the electronic instrument, image quality is degraded due to a phenomenon in which blurring is generated in an end portion. Generally, the tilt of the lens is desirably suppressed to about 0.25° or less in a camera having high resolution of 8 megapixel or more, in which the shake correction control is required.

When portions other than wires 34A to 34D are complete rigid bodies in lens actuator 70, the lens is hardly tilted even if movable unit 31 including the lens moves in a direction orthogonal to wires 34A to 34D.

However, movable unit 31 and coil unit 32, to which ends of wires 34A to 34D are connected, actually have elasticity in order to keep the drop strength. As to a structure having the elasticity in the portions to which the ends of wires 34A to 34D are connected, for example, it is conceivable that the wires are connected to protrusions provided at four corners of lower spring 43 or upper spring 44. When movable unit 31 and coil unit 32 to which the ends of wires 34A to 34D are connected have the elasticity, the lens is tilted by moment in a rotating direction, which is generated by a driving force performing the shake correction control or gravity applied in tilting the camera.

The lens is also tilted by a variation in dimension of a component or a variation of assembly. Therefore, in order to suppress the total tilts of the lens to about 0.25° or less, the lens tilt generated by the moment in the rotating direction is desirably suppressed to 0.05° or less.

The diameters of wires 34A to 34D are determined to suppress the lens tilt. In order to decrease the lens tilt, the spring constant is desirably increased in the vertical direction of the movement of movable unit 31, namely, the optical axis direction while the spring constant is decreased in the direction orthogonal to the front-back and left-right directions.

The diameters of wires 34A to 34D are selected in consideration of the moment in the rotating direction, which is generated by the driving force performing the shake correction control or gravity applied in tilting the camera, or the variation in dimension of the component and the variation of the assembly.

The connection positions of wires 34A to 34D are not limited to the above positions. For example, the upper ends of wires 34A to 34D may be connected to movable unit 31 while the lower ends of wires 34A to 34D are connected to coil unit 32.

The positions of the OIS coils are not limited to the side surfaces of magnets 48A to 48D, but the OIS coils may be disposed opposite the upper surface or the lower surface of one of magnets 48A to 48D.

In the first exemplary embodiment, movable unit 31 includes magnets 48A to 48D and 49A to 49D, and base 51 includes OIS coils 52A to 52D. Alternatively, the magnets may be disposed in base 51 while the OIS coils are disposed in movable unit 31.

The video image or the image shot by lens actuator 70 may be a still image or a moving image.

Magnets 48A to 48D and 49A to 49D may be disposed at the four corners of upper cover 36. The configuration of the magnets is not limited to the configuration of two upper and lower stages. For example, the magnet may have a single stage configuration in which magnets 49A to 49D are not provided or may have a configuration of three or more stages. AF coil 46A may be surrounded by one ring magnet.

Magnetic-field detection element 62A and 62B may be disposed opposite the upper surface or the lower surface of one of magnets 48A to 48D and the upper surface or the lower surface of one of magnets 49A to 49D.

As means for detecting the position of movable unit 31, for example, a photoreflector in which reflection of an infrared ray is used may be used in addition to the magnetic field detection.

The number of wires is not limited to four, but three or more wires may be provided.

Auto focus mechanism need not necessarily have AF coils 46A and 46B and magnets 48A to 48D. For example, the auto focus mechanism can use shape memory alloy, piezoelectric element or capacitive actuator.

Shake correction mechanism need not necessarily have OIS coils 52A to 52D and magnets 48A to 48D. For example, the shake correction mechanism can use shape memory alloy, piezoelectric element or capacitive actuator.

What is claimed is:

1. A lens actuator comprising:
    a movable unit that includes
        a carrier retaining a lens,
        an AF coil being wound around the carrier with an optical axis direction of the lens as a center,
        a magnet facing the AF coil in a direction perpendicular to the optical axis direction, and
        a holder fixing the magnet;
    a plurality of OIS coils that are disposed in at least two directions perpendicular to the optical axis direction while facing the movable unit;
    a base that fixes the OIS coils; and
    a plurality of wires that connect the movable unit and the base, wherein
    the carrier moves in the optical axis direction by an electromagnetic force generated between the AF coil and the magnet, the movable unit moves in the direction perpendicular to the optical axis direction by another electromagnetic force generated between the OIS coils and the magnet,
    the wires have diameters of 30 μm or more and less than 70 μm, and the wires have longitudinal elastic moduli of 100 GPa or more and less than 500 GPa.

2. The lens actuator according to claim 1, wherein the wires contain tungsten or a tungsten compound as a material, the wires have diameters of 30 μm or more and less than 60 μm, and the wires have longitudinal elastic moduli of 350 GPa or more and less than 500 GPa.

3. The lens actuator according to claim 1, wherein the wires are made of a copper alloy, the wires have diameters of 40 μm or more and less than 70 μm, and the wires have longitudinal elastic moduli of 100 GPa or more and less than 150 GPa.

4. A lens actuator comprising:
    a movable unit that includes
        a carrier retaining a lens,
        an AF coil being wound around the carrier with an optical axis direction of the lens as a center,
        a plurality of OIS coils that are disposed outside the AF coil and in at least two directions perpendicular to the optical axis direction, and
        a holder fixing the OIS coils;
    a magnet that is disposed while facing the movable unit in the direction perpendicular to the optical axis direction;
    a base that fixes the magnet; and
    a plurality of wires that connect the movable unit and the base, wherein
    the carrier moves in the optical axis direction by an electromagnetic force generated between the AF coil and the magnet, the movable unit moves in the direction perpendicular to the optical axis direction by another electromagnetic force generated between the OIS coils and the magnet,
    the wires have diameters of 30 μm or more and less than 70 μm, and the wires have longitudinal elastic moduli of 100 GPa or more and less than 500 GPa.

5. The lens actuator according to claim 4, wherein the wires contain tungsten or a tungsten compound as a material, the wires have diameters of 30 μm or more and less than 60 μm, and the wires have longitudinal elastic moduli of 350 GPa or more and less than 500 GPa.

6. The lens actuator according to claim 4, wherein the wires are made of a copper alloy, the wires have diameters of 40 μm or more and less than 70 μm, and the wires have longitudinal elastic moduli of 100 GPa or more and less than 150 GPa.

7. A lens actuator comprising:
    a movable unit that has an auto focus mechanism;
    a base facing the movable unit;
    a plurality of wires that connect the movable unit and the base; and
    a shake correction mechanism that is disposed to move the movable unit,
    wherein the wires have diameters of 30 μm or more and less than 70 μm, and the wires have longitudinal elastic moduli of 100 GPa or more and less than 500 GPa.

* * * * *